United States Patent [19]

Carter et al.

[11] Patent Number: 5,144,125
[45] Date of Patent: Sep. 1, 1992

[54] FIBER OPTIC BASED FIRE DETECTION AND TRACKING SYSTEM

[75] Inventors: Hudson R. Carter, Granville; Cevdet G. Koksal, Alliance, both of Ohio

[73] Assignee: The Babcock & Wilcox Company, New Orleans, La.

[21] Appl. No.: 626,605

[22] Filed: Dec. 12, 1990

[51] Int. Cl.$^5$ .............................................. H01J 5/16
[52] U.S. Cl. ............................. 250/227.15; 340/577
[58] Field of Search ............... 250/227.11, 227.14, 250/227.15, 554; 340/541, 577, 578; 356/73.1

[56] References Cited

U.S. PATENT DOCUMENTS

| | | | |
|---|---|---|---|
| 3,981,592 | 9/1976 | Williams | 250/227.15 |
| 4,379,289 | 4/1983 | Peek | 250/227.15 |
| 4,450,434 | 5/1984 | Nielsen et al. | 250/227.15 |
| 4,896,141 | 1/1990 | Farquhar et al. | 250/227.14 |
| 5,015,842 | 5/1991 | Fradenburgh et al. | 250/227.15 |

*Primary Examiner*—David C. Nelms
*Attorney, Agent, or Firm*—Vytas R. Matas; Robert J. Edwards; Daniel S. Kalka

[57] ABSTRACT

An apparatus and method is disclosed for a fiber optic based fire detection and tracking system. An optical time domain reflectometer (OTDR) interrogates at least one optical fiber with a melting point defining a threshold temperature for fire detection. The OTDR measure the time of flight of a light pulse originating at each optical fiber input end and reflected back to determine the linear position of interruptions along an optical fiber which allows for fire detection and location.

10 Claims, 2 Drawing Sheets

FIBER OPTIC BASED FIRE DETECTION AND TRACKING SYSTEM

BACKGROUND OF THE INVENTION

1. FIELD OF THE INVENTION

The present invention relates in general to a fire detection and location system, and in particular, to a fiber optic fire detection and location system employing optical time domain reflectometry.

2. DESCRIPTION OF THE RELATED ART

Fire detection and monitoring have historically been difficult in many compartmentalized structures primarily because of the limitations of currently available sensors. These sensors are generally discrete in nature, requiring the use of large number of units for adequate coverages of a structure such as a naval vessel or other large complicated structures like offshore drilling rigs, power plants, petrochemical plants, warehouses, factories and buildings. Networking of the several sensors both to trigger local alarms and to notify a central monitoring point requires an expensive, custom-engineered system. Traditional fire detection sensors are often unreliable due to the misidentification of ambient conditions as fire.

As an example, smoke detectors are often used for shipboard applications. Opacity-type detectors are used in place of ionization-type detectors to limit radiation dose to ship's personnel and to avoid false alarms caused by background radiation. Opacity sensors, however, experience frequent false indications due to airborne substances including moisture and are often ignored as a result. In addition, one or more detectors are required for each of the several hundred compartments on board ship for adequate monitoring. Often, there are several spaces such as cable trays and electronics cabinets which are impossible to access with smoke detectors.

On some vessels, once a shipboard fire is correctly identified, the ship's personnel must communicate fire and damage reports to command by sound-powered phone or by messenger since these detectors alarm only locally. This type of situation can result in mistaken information and response particularly in view of the stress involved.

There exist techniques for interpreting Rayleigh back scattering along an optical fiber. A portion of the light traveling through an optical fiber is continuously back-scattered due to Rayleigh scattering. Disturbances along the fiber length, such as changes in temperature and stress on the fiber have been shown to change the index of refraction and the proportion of backscattered light. The York G2 system employs this principle in conjunction with complicated electronics to provide a distributed measurement of the temperature profile along a fiber length.

U.S. Pat. No. 4,839,527 discloses a fiber optic sensor system for the detection and/or analysis of smoke, gas, or the like. This is achieved with discrete sensors at fixed locations.

U.S. Pat. No. 4,505,542 describes a fiber optic temperature monitoring system with a discussion of the different claddings available for fiber optics. While this reference teaches of the detection of fire, it does not provide for locating the fire or its progression since fire anywhere along the length of the waveguide will similarly interrupt the transmission of light.

Thus, there is a need for a simple, reliable fiber optic fire detection and tracking system capable for use in large complicated structures. U.S. Pat. No. 4,843,234 demonstrated that the length of an optical fiber can be determined from the transit time for light traveling to the free end of the fiber using an optical time domain reflectometer (OTDR). However, this reference is very particularly directed to the measurement of the tip location of a consumable electrode.

SUMMARY OF THE INVENTION

The present invention solves the aforementioned problems of the prior art as well as others by providing an apparatus and method for detecting and locating a fire with fiber optics employing optical time domain reflectometry. At least one optical fiber with a melting point defining the threshold temperature for fire detection is situated at a predetermined location in the structure. A light pulse is sent through each optical fiber at an input end. The flight of the light pulse is timed from where it originated at each optical fiber input end to when it is reflected back. This allows for the determination of linear resolution of each optical fiber which provides fire detection and location.

Preferably, a light pulse is sent through one end of each optical fiber and timed from where it originated to when it is reflected back. A computer relates position on each optical fiber to an installed position for detection and location of the fire. The computer may be programmed to interpret the change in distance to an optical fiber break for predicting the progression of a fire in the structure.

Advantageously, a network of optical fibers can be arranged in a predetermined orientation to provide for optical multiplexing.

Accordingly, one aspect of the present invention is to provide a fiber optic fire detection and tracking system which is simple yet reliable for complicated compartmentalized structures.

Another aspect of the present invention is to provide such a system that is cost-effective.

A further aspect of the present invention is to provide a continuous fiber configuration which is easily adaptable to the geometric requirements of any structure to be monitored. The continuous configuration allows fire detection anywhere along the fiber length. This configuration permits the substitution of an inexpensive optical fiber for the multitude of discrete sensors required for a large compartmentalized structure.

The various features of novelty which characterize the present invention are pointed out with particularity in the claims annexed to and forming a part of this disclosure. For a better understanding of the present invention and the operating advantages attained by its use, reference is made to the accompanying drawings and descriptive matter in which a preferred embodiment of the invention is illustrated.

DESCRIPTION OF THE PREFERRED EMBODIMENT

Figure 1:
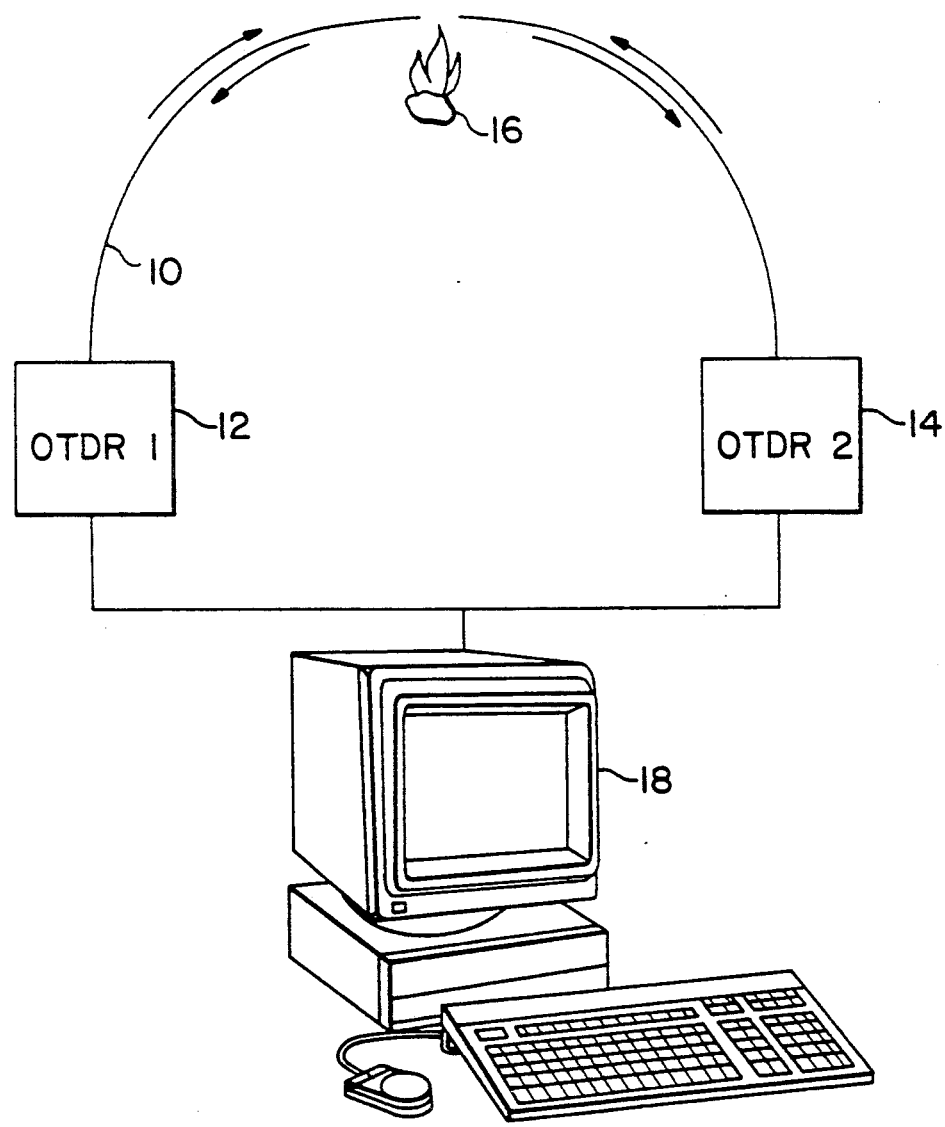
FIG. 1 is a schematic of an embodiment of the present invention.

Referring to FIG. 1, an optical fiber (10) is connected between two optical time domain reflectometers (OTDRs) (12, 14). Optical fiber (10) is positioned in a predetermined fashion in some structure (not shown). The OTDRs (12, 14) send a light pulse through each optical fiber end in the direction of the arrows and measure the time of flight for determining the length of the optical fiber (10). There are several grades of OTDRs that are available which differ primarily in time resolution. Time resolution is important because it alone defines the linear resolution to which the position of an interruption in the fire detection system along the optical fiber (10) may be determined. The location of the interruption within the structure is determined from the linear position of the interruption along the optical fiber (10). There are OTDRs available which will allow the location of a fire to within a few feet over a fiber length of several hundred feet. The least expensive OTDRs are capable of locating breaks to within about 15 feet.

Similarly, there are several types of optical fibers that are commercially available. The critical fiber characteristic in this application is the melting point which defines the threshold temperature at which the fiber fails and interrupts optical transmission. In the preferred embodiment, the optical fiber (10) is formed from a polymer which softens at approximately 210° F., which is about the temperature of saturated steam at atmospheric pressure and fails readily above this temperature. In most cases, this would allow the differentiation of humidity and atmosphere steam from an actual fire. An acrylic flourinated polymer fiber is preferred since it has a softening point of 210° F.

It is envisionable that optical fibers composed of different materials may be used in various applications for a range of melting points.

Prior to any discontinuity in the optical fiber (10), both OTDRs (12, 14) indicate the total length of the fiber by sending a light pulse through an input end and measuring the time of flight of the light pulse as it is reflected back. When a discontinuity is caused by the melting of the fiber at an abnormally hot location (16) such as a fire site, the time of flight for the light pulse sent by the OTDR and reflected back by the discontinuity is divided by the characteristic speed of light in the fiber material. This allows determination of the position of the discontinuity along the fiber according to the following equation:

$$\text{Length to Break} = \frac{T_1 - T_0}{2C_f} \quad (1)$$

where:
$C_f$ = the speed of light in the optical fiber.
$T_0$ = the time of the light input from the OTDR.
$T_1$ = the time the light is reflected back to the OTDR by the fiber end.

The OTDRs (12, 14) are preferably connected to a computer (18) which receives this information and performs the calculations for each OTDR (12, 14) to determine the position of the fire as it relates to the linear position to the optical fiber (10). Of course, it is envisionable that OTDRs (12, 14) contain microprocessors to perform this calculation in an alternate embodiment.

Figure 2:
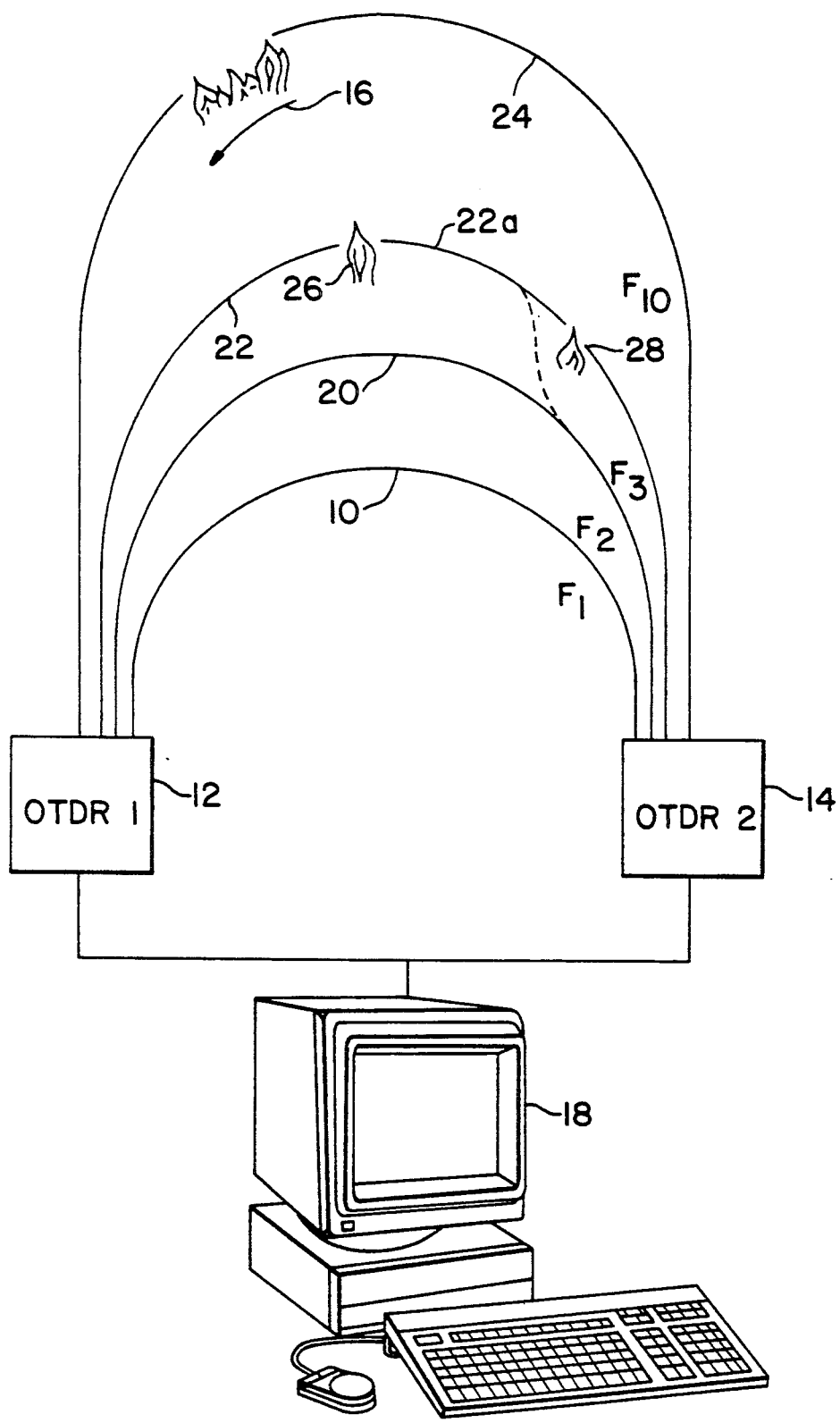
FIG. 2 is a schematic illustration of another embodiment according to the present invention.

Next, referring to FIG. 2, where like numerals designate like features, there is illustrated the preferred embodiment of the present invention employing optical multiplexing. In a large compartmentalized structure such as a ship (not shown), four or more optical fibers (10, 20, 22, 24) are multiplexed to OTDRs (12, 14). A software map on computer (18) relates position on each fiber to an installed position within the structure which is programmed into system memory. The system software is also programmed to interpret the change in distance to an optical fiber break as a moving flame front as depicted in the flame migration from the initial event (16) to the secondary event (26) and finally to the tertiary event (28). This enables the system to predict the progression of a fire and via computer (18) trigger appropriate advisories either automatically or manually.

The network fiber routing approach as depicted in FIG. 2 is used to enable the system to detect multiple fiber breaks. In contrast, the system of FIG. 1 might be subject to "blindspots" in some potential fire scenarios.

In a shipboard example, an exploding missile is likely to spread unspent rocket fuel over a wide area starting several fires. The initial explosion and fire would break fiber continuity at the impact site and be located by the system. The intact fiber on either side of the break would continue to be interrogated by the respective OTDRs (12, 14). A subsequent fire (26, 28) away from the initial break (16) would interrupt fiber continuity at another location. Although the location of this break would also be detected, both OTDRs would be blind in the area between the breaks, designated (22a) in optical fiber (22). Through networking, the size of potential blindspots may be reduced to acceptable limits.

The present invention allows for other enhancements to the basic fire detection and location system such as two or more optical fibers with different melting temperatures used in parallel for each fiber path. The different fibers are wound into a single cable for each path. A sequential failure of the fibers in a cable is indicative of an intensifying fire. A simultaneous failure of the fibers indicates a discrete event such as an explosion or accidental or intentional breakage. Other available information simplifies the distinction between an explosion and a non-fire related damage.

Although not required for operation of the present invention, additional information is obtainable from an analysis of changes in Rayleigh backscattering along an optical fiber to enhance the interpretation of detected phenomenon. Changes in fiber temperature or stress which may proceed or follow a fiber break event change the index of refraction and the proportion of backscattered light. Thus, an abrupt fiber break accompanied by a change in Rayleigh backscattering is interpreted as an explosion rather than a simply cut or broken fiber.

The subject invention provides the following advantages over other prior art systems:

1. The subject invention employs a continuous fiber configuration which is easily adaptable to the geometric requirements of any structure to be monitored such as cableways, ventilation ducts, or simply affixed to ceilings, walls and floors. The continuous configuration allows fire detection anywhere along the fiber length. This arrangement permits the substitution of inexpensive optical fibers for discrete sensors. It also permits fire propagation and travel to be monitored and predicted. In addition, this provides a convenient means for generating alarms t a central location as opposed to the typical smoke detectors generating only local alarms requiring human interaction.

2. Many optical fibers may be multiplexed to individual OTDRs to produce a comprehensive low-cost monitoring network. A networked optical fiber layout permits the system to continue to function and Provide valuable information for fire containment in the face of a wide spread conflagration.

3. The system is assembled from commercially available OTDRs and optical fiber which are typically low in cost and exhibit proven reliability. Optical fibers are available in a multitude of materials and coatings for the appropriate temperature threshold for the planned application.

4. Optical fibers are totally passive and do not contribute to the risk of fire in potentially flammable or explosive applications. They are insensitive to electromagnetic and radio frequency interference so no false alarms are generated by the fields present in installations like cableways. Optical fibers are also insensitive to environmental influences such as high humidity and cigarette or cigar smoke which often trigger false alarms.

5. The present invention provides a safe alternative to ionization smoke detectors which are not suitable for small, densely occupied areas. Ionization detectors are also subject to frequent false alarms in facilities where moderate to high background radiation is present.

6. The further analysis of Rayleigh backscattering provides diagnostic information to prevent false alarms due to fiber breaks which result accidentally or as a result of vandalism. It can be the basis for additional warnings and advisories which may be used to alert personnel of impending fire or other dangerous conditions.

While a specific embodiment of the invention has been shown and described in detail to illustrate the application of principles of the invention, certain modifications and improvements will occur to those skilled in the art upon reading the foregoing description. It is thus understood that all such modifications and improvements have been deleted herein for the sake of conciseness and readability but are properly in the scope of the following claims.

WHAT IS CLAIMED IS:

1. An apparatus for detecting and locating a fire, comprising:
   at least one optical fiber with a melting point defining a threshold temperature for fire detection, said at least one optical fiber having a first and a second end;
   a first optical time domain reflectometer connected to said first end of said at least one optical fiber for sending a light pulse through said at least one optical fiber at a first input end, said first optical time domain reflectometer detecting the light pulse sent through said at least one optical fiber and timing a flight of the light pulse originating at the first input end of said at lease one optical fiber and reflected back;
   a second optical time domain reflectometer connected to said second end of said at least one optical fiber for sending a light pulse through said at least one optical fiber at a second input end, said second optical time domain reflectometer detecting the light pulse sent through said at least one optical fiber and timing a flight of the light pulse originating at the second input end of said at least one optical fiber and reflected back; and
   a computer in communication with said first and second optical time domain reflectometers for determining linear resolution of said at least one optical fiber from the timed flight of light pulses of the first and second optical time domain reflectometers for detecting and locating the fire.

2. An apparatus as recited in claim 1, wherein said at least one optical fiber includes a plurality of optical fibers.

3. An apparatus as recited in claim 2, wherein said computer is programmed to predict progression of a fire from change in linear resolution of an optical fiber.

4. An apparatus as recited in claim 2, wherein at least one optical fiber is formed of an acrylic fluorinated polymer.

5. An apparatus as recited in claim 4, wherein at least one optical fiber has a different melting temperature from said acrylic fluorinated optical fiber and is situated proximate to said acrylic fluorinated optical fiber.

6. An apparatus as recited in claim 2, wherein said plurality of optical fibers are arranged in a predetermined orientation in a structure to be monitored, said plurality of optical fibers being multiplexed to said first and second optical time domain reflectometers.

7. A method for detecting and locating a fire, comprising the steps of:
   positioning at least one optical fiber with a melting point defining a threshold temperature for fire detection in a structure to be monitored;
   sending a light pulse through said at least one optical fiber at a first input end with a first optical time domain reflectometer;
   detecting the light pulse sent through said at least one optical fiber with the first optical time domain reflectometer;
   determining a time of flight of the light pulse originating at the first input end of said at least one optical fiber and reflected back;
   sending a second light pulse with a second optical time domain reflectometer through a second input end of said at least one optical fiber;
   detecting the second light pulse sent through said at least one optical fiber;
   determining a time of flight of the second light pulse originating at the second input end of said at least one optical fiber and reflected back; and
   calculating a linear position of any break in said at least one optical fiber for detecting and locating the fire.

8. A method as recited in claim 7, wherein the positioning step includes arranging a plurality of optical fibers in a network in a predetermined orientation in the structure to be monitored for optical multiplexing with the first and second optical time domain reflectometers.

9. A method as recited in claim 7, further comprising the step of determining change in linear position from the timed flights of the light pulses of said at least one optical fiber to identify a break in said at least one optical fiber for predicting progression of a fire.

10. A method as recited in claim 8, further comprising the step of evaluating the timed flights of the light pulses from the plurality of optical fibers composed of different materials for distinguishing a fire from other events.

* * * * *